United States Patent [19]

Strazdins

[11] Patent Number: 4,781,312

[45] Date of Patent: Nov. 1, 1988

[54] LIQUID DISPENSER

[75] Inventor: Atis Strazdins, Unanderra, Australia

[73] Assignee: Strazdins (International) Pty. Limited, Sydney, Australia

[21] Appl. No.: 929,361

[22] Filed: Nov. 12, 1986

[30] Foreign Application Priority Data

Jul. 3, 1986 [AU] Australia .............................. PH06728

[51] Int. Cl.$^4$ ............................................. B65D 85/54
[52] U.S. Cl. .................................... 222/309; 222/380; 222/571
[58] Field of Search ............... 222/506, 545, 555, 158, 222/157, 452, 448, 440, 438, 444, 424.5, 557, 309, 372, 380, 571

[56] References Cited

U.S. PATENT DOCUMENTS 3,160,331 12/1964 Trumbull et al. ................... 222/409
3,349,973 10/1967 Smith ................................... 222/571
3,369,706 2/1968 Schnyder ............................ 222/449

Primary Examiner—Joseph J. Rolla
Assistant Examiner—Kenneth Noland
Attorney, Agent, or Firm—Vorys, Sater, Seymour & Pease

[57] ABSTRACT

A liquid dispenser having a downwardly facing outlet with liquids of relatively high viscosity usually forming a meniscus at the outlet, the size of the meniscus being determined by the physical properties of the liquid, the atmospheric conditions, and also the cleanliness of the outlet nozzle. The present invention seeks to overcome this problem by providing means to generate a suction within the nozzle after the liquid has been dispensed, to draw any liquid within the area of the outlet of the nozzle back into the nozzle.

8 Claims, 3 Drawing Sheets

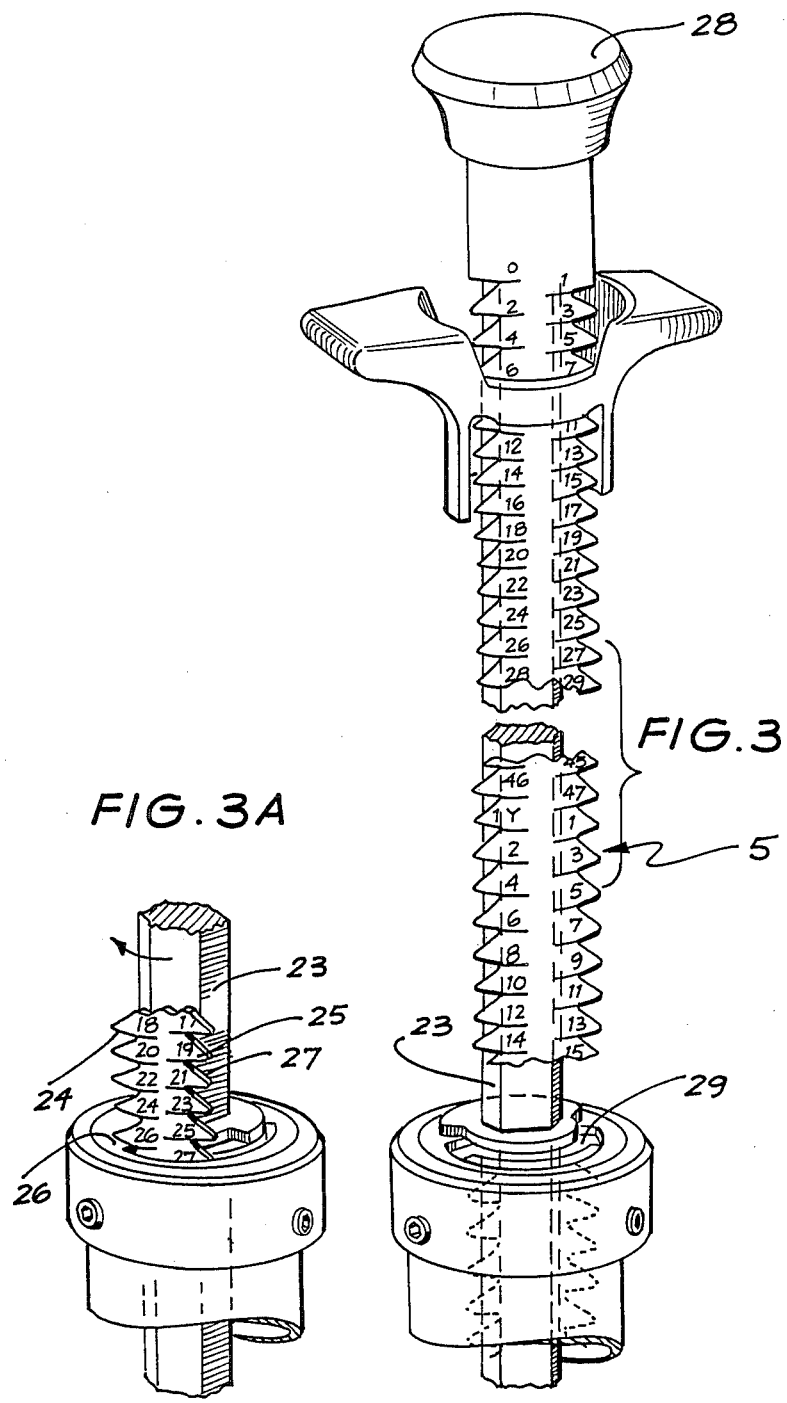

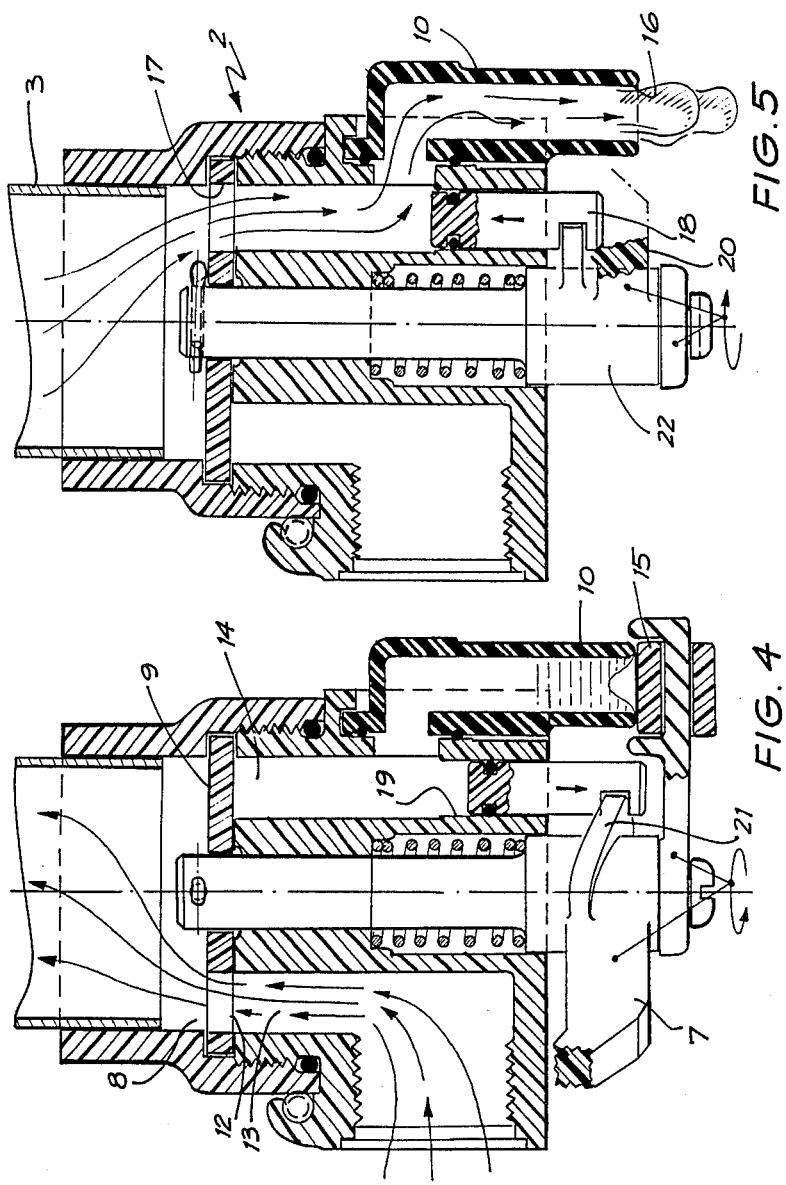

LIQUID DISPENSER

The present invention relates to a liquid dispenser and in particular to a colourant dispenser used in the preparation of coloured paints.

In the paint industry, paint is supplied to retail outlets in a small number of coloured bases. To produce each of the multitude of the various colours offered in the colour charts, various colourants in predetermined quantities have to be added to a selected base. These quantities have to be accurately measured and dispensed. Colourant dispensers having a variable volume pump chamber have been developed for this purpose.

However existing dispensers suffer from the disadvantage of the colourant, usually a liquid dispersion of pigments, which has a relatively high viscosity, forming a meniscus on the outlet nozzle. The problem with the meniscus is that if it is wiped into the base container, the exact quantity of colourant dispensed is unknown, as the size of the meniscus of any particular colourant formed varies with the atmospheric conditions and also the cleanliness of the outlet nozzle of the dispenser.

Further it is sometimes required to close off the outlet and if a meniscus of colourant is present at the outlet, the smearing of the colourant across the closure occurs and possibly the sticking of the colourant around the outlet of the nozzle can occur as the colourant dries.

Also with viscous liquids such as honey, molasses and the like it is necessary to draw the liquids back into the nozzle to lessen the problems of the "stickiness" of the liquids around the nozzle and closure when the nozzle is closed.

The present invention seeks to overcome this problem by providing a liquid dispenser comprising:

a substantially downwardly projecting nozzle having an outlet located at or adjacent one end thereof;

a first chamber communicating via said nozzle to said outlet;

a second chamber communicating with said first chamber;

sealing means adapted to releasably seal said first chamber from said second chamber; and suction means to produce a reduced pressure within said first chamber when said sealing means has sealed said first chamber from said second chamber, so as to draw material in said substantially downwardly projecting nozzle or suspended at said outlet back up said nozzle.

The invention will now be described by way of example with reference to the accompanying drawings, in which:

FIGS. 3 and 3A are detail drawings of the plunger pump of FIG. 1 showing the locking mechanism of the colourant volume gauge;

FIG. 4 is a partial section of the valve of the embodiment shown in FIG. 1 with the valve in the dispenser filling or nozzle closing mode; and FIG. 5 illustrates the valve of FIG. 4 showing the valve in delivery mode.

Figures 1, 2:
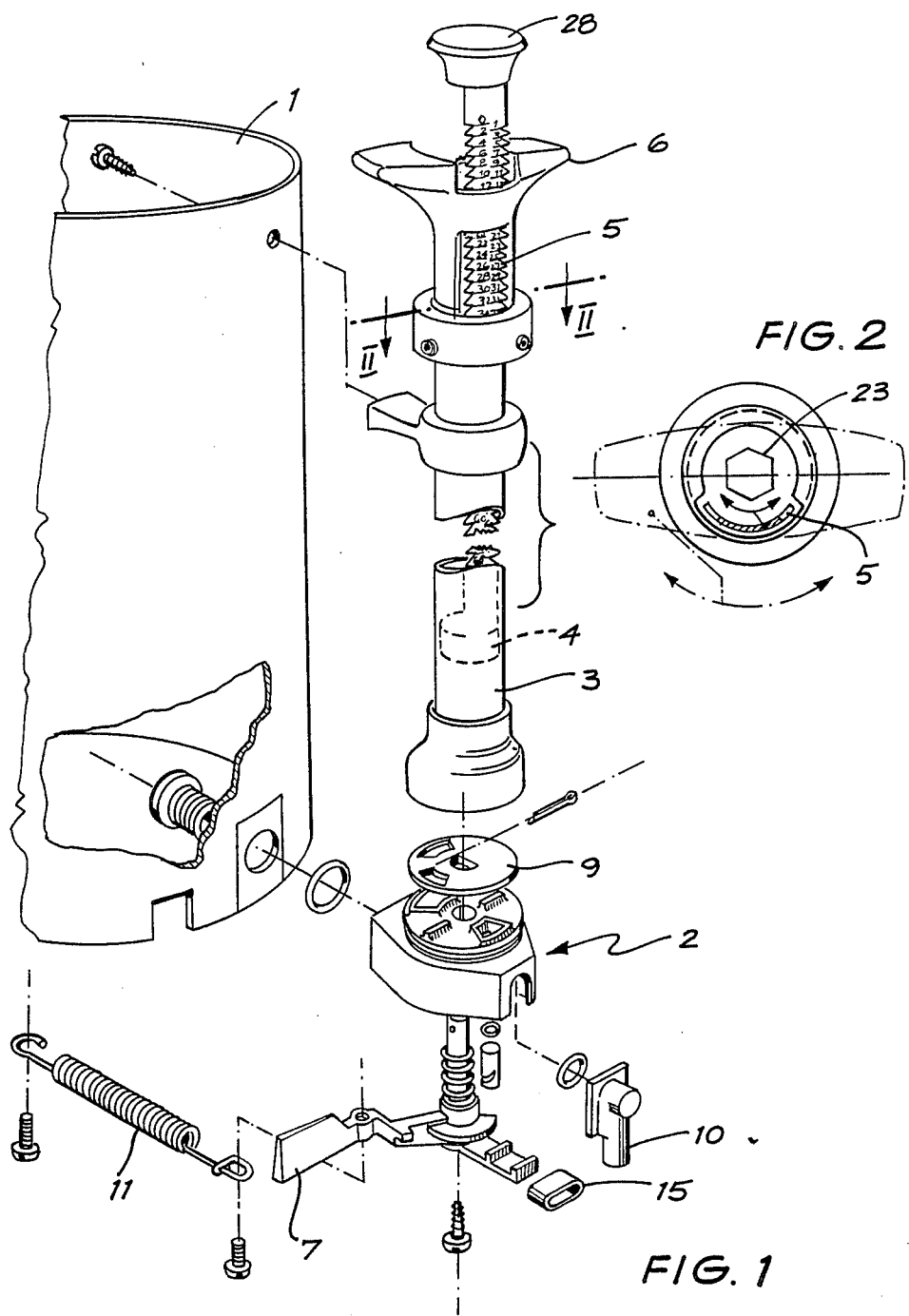
FIG. 1 is an exploded view of an embodiment of the present invention when applied to a paint colourant dispenser.
FIG. 2 is a sectional view taken in the direction of arrows II of the plunger pumps of the embodiment illustrated in FIG. 1.

The present invention will now be described with reference to a paint colourant dispenser by way of example, and it should be recognised that other liquid dispensers also fall within the scope of the present invention.

As shown in FIG. 1 the paint colourant dispenser of one embodiment of the present invention comprises a paint colourant storage tank 1, connected to a dispensing valve body 2. The colourant is drawn into the measuring chamber 3 by means of the plunger 4 which is in slideable sealing engagement within the measuring chamber 3. The quantity of colourant required is picked on the gauge 5 and the plunger 4 lifted by means of the wings 6 to raise the plunger 4 and the gauge 5 to line up the required marking on the gauge with the reference marker.

The operating lever 7 is then moved (as shown in FIG. 5) to seal the entrance 8 between the storage tank 1 and the measuring chamber 3 by means of the valve plate 9 which simultaneously opens communication between the measuring chamber and the outlet nozzle 10. The plunger 4 is then pushed downwardly to force the colourant in the measuring chamber 3 out of the nozzle 10.

As shown in FIG. 1 the valve plate 9 is biased in the non-delivery position by a spring 11 holding the operating lever 7 which results in the position of the valve 9 as shown in FIG. 4.

In this position the opening 12 in the valve 9 is lined up with the passageway 13 allowing communication between the storage tank 1 and the measuring chamber 3. In this mode the passageway 14 is blocked by the valve plate 9 and the closure 15, a rubber pad, seals against the nozzle outlet 16.

When the valve plate 9 is turned to its delivery position the passageway 13 is blocked and the opening 17 aligns with the passageway 14 to allow the colourant in the measuring chamber 3 to be forced out of the dispenser. In the fully open position the piston 18, which is in slideable sealing engagement in the cylinder 19, is positioned such that its top is substantially level with the inlet to the nozzle 10.

Due to the viscosity and surface tension of the colourant liquid a quantity of liquid remains in the nozzle 10 and forms a bubble or miniscus at the nozzle outlet 16. To overcome this problem the piston 18 has a recess 20 into which fits an angled cam/projection 21 connected to the spindle drive 22 of the valve plate 9.

When the required amount of colourant has been discharged the lever 7 is allowed to return to its non discharge mode position as shown in FIG. 4 resulting firstly in the valve plate 9 blocking the passageway 14, and then causing the piston 18 to be drawn deeper into the cylinder 19 by means of the recess 20 riding down the sloping cam 21. Because the valve 9 effectively seals the passageway 14 from the measuring chamber 3 and the piston 18 sealing engages in the cylinder 19 a reduced pressure occurs in the passageway 14 sucking the liquid remaining in the nozzle 10 and or the liquid bubble or miniscus at the outlet 16 back up the nozzle 10 such that the closure 15 can sealingly engage the outlet 16, with a reduced or eliminated smearing of colourant on the closure 15.

As shown in the drawings the nozzle 10 slideably fits into the dispensing valve body 2 in sealing engagement therewith.

A problem involved with metering out the quantity of colourant is the repeatability of any particular quantity setting. To overcome this problem the present invention also provides a specific construction of the plunger and gauge as shown in FIGS. 2, 3 and 3A. As is the same with prior art dispenser, the gauge 5 can be moved along the plunger shaft 23. However the plunger shaft 23 together with the gauge 5 can be rotated as shown in FIG. 2 from the central free moving position of the gauge 5 to the left or right to lock the gauge 5 into the specific measure shown on the gauge 5.

As is shown in FIGS. 3 and 3A the gauge 5 has two series of measurements on one side the even numbered measures and on the other the odd numbered. Exactly level with each measurement is the bottom edge 24 of a protrusion 25.

The edges 24 are parallel to the surface of the locking plate 26 to ensure an exact and reproducible setting of the gauge 5. To lock the gauge 5 and thus the plunger 4 into a particular measurement the chosen measurement is adjusted to line up with the locking plate and the plunger shaft 23 and the gauge are rotated to the left (as shown in FIG. 3A) for even measures and to the right for odd measures whereby the locking cap 29 holds the gauge in position. Because the top edge 27 of the protrusions 25 are tapered and the bottom edge 24 are parallel to the surface of the locking plate 26, each measure on the gauge is exactly reproducible.

As the length of the gauge 5 projecting above the locking plate 26 determines the upward extent of the movement of the plunger shaft 23, because of the flared top 28 of the gauge 5 stopping movement of the plunger shaft 23, the exact measure of colourant can be repeatedly obtained, in successive dispensing of the same amount of colourant if desired.

It should be obvious that modifications could be made to the above described dispenser without departing from the scope or spirit of the present invention.

I claim:

1. A liquid dispenser comprising:
    a substantially downwardly projecting nozzle having an outlet located at or adjacent one end thereof;
    a first chamber communicating via said nozzle to said outlet;
    a second chamber communicating with said first chamber;
    sealing means for releasably sealing said first chamber from said second chamber, said sealing means comprising a rotatable plate;
    suction means for producing a reduced pressure within said first chamber when said sealing means has sealed said first chamber from said second chamber, so as to draw material in said substantially downwardly projecting nozzle or suspended at said outlet back up said nozzle, said suction means comprising a plunger sealingly slidable in a cylinder; and
    a spindle, the rotation of which rotates said rotatable plate, and which, after said rotatable plate is in its sealing position, causes said plunger to move down the cylinder to produce the reduced pressure within said first chamber.

2. A liquid dispenser according to claim 1, wherein said plunger has a slot therein said spindle has a projection engaging in said slot and which spirals down said spindle such that, on rotation of the spindle, the slot of the plunger rides down the spiral to cause the plunger to move down the cylinder.

3. A liquid dispenser according to claim 2, further comprising a closure connected to said spindle wherein said closure seals the outlet of the nozzle after said reduced pressure is produced.

4. A liquid dispenser according to claim 1, wherein said second chamber is adapted for connection to a liquid reservoir and communicating to said first chamber via a third chamber, and wherein said rotatable plate has an opening therethrough whereby, when said rotatable plate seals said first chamber from said third chamber, said second chamber is in communication and, when said rotatable plate seals said second chamber from said third chamber, said first chamber is in communication with said third chamber.

5. A colourant dispenser used in the preparation of coloured paints comprising:
    a first chamber adapted to be connected to a reservoir of colourant and communicating via an outlet into the base of an elongated second chamber;
    third chamber connected via an inlet to the base of the elongated second chamber, and having a substantially downwardly projecting nozzle with an outlet located therein;
    a spindle having a rotatable valve plate located thereon with an opening therein, such that, when said opening is aligned between said first chamber and said second chamber, said rotatable valve plate seals said second chamber from said third chamber, and when said opening is aligned between said second chamber and said third chamber, said rotatable valve seals said first chamber from said second chamber; and
    a plunger sealingly slidably located within a cylinder in said third chamber, whereby rotation of said spindle causes said rotatable valve plate to seal said second chamber from said third chamber, and then for said plunger to be withdrawn into said cylinder to cause a reduced pressure within said third chamber, so as to draw material in said substantially downwardly projecting nozzle and at the outlet thereof back up the nozzle.

6. A colourant dispenser according to claim 5, wherein said plunger has a recess therein which mates with a projection located on the spindle such that, when the spindle is rotated, the plunger rides down the projection withdrawing into said cylinder to cause a reduced pressure within said third chamber.

7. A colourant dispenser according to claim 6, further comprising a closure connected to said spindle wherein said closure seals the outlet of the nozzle after said reduced pressure is produced.

8. A colourant dispenser according to claim 7, further comprising:
    a plunger adapted to be moved within said second chamber to control the volume thereof;
    an adjustable scale having projections with shoulders aligning with the scale markings, such that said scale can be moved to the required marking and rotated to releasably lock onto a locking plate located on the top of the second chamber;
    a stop located on said adjustable scale to prevent the upward movement of the plunger, such that a required amount of colourant can be repeatedly discharged.

* * * * *